(12) United States Patent
Toma et al.

(10) Patent No.: US 7,905,462 B2
(45) Date of Patent: Mar. 15, 2011

(54) END COVER FOR VEHICLE SEAT ADJUSTER

(75) Inventors: Leon Tony Toma, Commerce Township, MI (US); Bill Deming, Fenton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1081 days.

(21) Appl. No.: 11/549,143

(22) Filed: Oct. 13, 2006

(65) Prior Publication Data

US 2007/0194200 A1    Aug. 23, 2007

Related U.S. Application Data

(60) Provisional application No. 60/771,200, filed on Feb. 7, 2006.

(51) Int. Cl.
   *B60N 2/00*    (2006.01)
(52) U.S. Cl. ............... 248/429; 248/424; 297/344.11
(58) Field of Classification Search ............ 248/424, 248/429, 430; 297/344.11
   See application file for complete search history.

(56) References Cited

U.S. PATENT DOCUMENTS

| 5,188,329 | A | | 2/1993 | Takahara et al. |
|---|---|---|---|---|
| 5,209,447 | A | | 5/1993 | Yokota et al. |
| 5,242,143 | A | | 9/1993 | Nagashima et al. |
| 5,275,369 | A | | 1/1994 | Kamata et al. |
| 5,454,541 | A | | 10/1995 | Ito et al. |
| 5,482,243 | A | | 1/1996 | Minder |
| 5,813,726 | A | * | 9/1998 | Husted ............... 297/378.11 |
| RE37,990 | E | * | 2/2003 | Yamada et al. ............ 248/430 |
| 6,623,061 | B2 | | 9/2003 | Tourangeau et al. |
| 6,648,394 | B2 | * | 11/2003 | Lejeune et al. .......... 296/65.13 |
| 7,073,764 | B2 | | 7/2006 | Matsushiro et al. |
| 7,150,441 | B2 | * | 12/2006 | Leguede et al. ............ 248/423 |
| 7,488,026 | B1 | * | 2/2009 | Jovicevic ............... 296/65.13 |
| 2006/0037523 | A1 | * | 2/2006 | Futaki .................. 114/55.53 |

FOREIGN PATENT DOCUMENTS

| JP | 04087843 | 3/1992 |
|---|---|---|
| JP | 06135266 | 5/1994 |

* cited by examiner

*Primary Examiner* — Terrell McKinnon
*Assistant Examiner* — Steven M Marsh
(74) *Attorney, Agent, or Firm* — Gifford, Krass, Sprinkle, Anderson & Citkowski, P.C.

(57) ABSTRACT

A cover assembly covers a portion of a seat adjuster mechanism, wherein the seat adjuster mechanism includes a lower member configured to be coupled to a vehicle floor and an upper member operative for substantially vertical adjustment relative to the lower member. The cover assembly includes a lower cover and an upper cover. The lower cover is coupled to the lower member for concealing at least part of the lower member. The upper cover covers at least part of the upper member. The upper cover is pivotally coupled to the upper member of the adjuster mechanism and pivotally coupled to the lower cover so as to conceal the at least part of the upper member of the adjuster mechanism during the vertical adjustment of the upper member relative to the lower member.

17 Claims, 2 Drawing Sheets

END COVER FOR VEHICLE SEAT ADJUSTER

CROSS REFERENCE TO RELATED APPLICATION

This application claims priority to U.S. provisional patent application No. 60/771,200, which was filed Feb. 7, 2006 and is incorporated herein by reference in its entirety.

BACKGROUND OF THE INVENTION

1. Field of the Invention

The invention relates to seats in automotive vehicles. More particularly, the invention relates to a cover that is pivotable and has a living hinge to accommodate height adjustment of a seat in an automotive vehicle.

2. Description of the Related Art

With reference to FIG. 1, a portion of a conventional seat assembly for a vehicle is shown. The seat assembly includes a seat cushion for supporting an occupant above a floor in the vehicle. An adjuster mechanism 12 is mounted to the bottom of the seat cushion. More specifically, the adjuster mechanism 12 includes a track mechanism 14 that allows selective fore/aft adjustment of the seat cushion along the floor. The adjuster mechanism 12 also includes a height adjuster 16 that allows selective vertical adjustment of the seat assembly relative to the floor.

Typically, one-piece covers are used to conceal the rear portion of the adjuster mechanism, particularly the track mechanism 14. Yet, in the fully raised position, much of the seat adjuster mechanism 12 is still visible, which from an appearance standpoint is generally undesirable.

Accordingly, it remains desirable to provide a cover that substantially conceals the adjuster mechanism in all of its fore/aft and vertical positions.

SUMMARY OF THE INVENTION

According to one aspect of the invention, a cover assembly is provided for covering a portion of a seat adjuster mechanism, wherein the seat adjuster mechanism includes a lower member configured to be coupled to a vehicle floor and an upper member operative for substantially vertical adjustment relative to the lower member. The cover assembly includes a lower cover and an upper cover. The lower cover is coupled to the lower member for concealing at least part of the lower member. The upper cover covers at least part of the upper member. The upper cover is coupled to the upper member of the adjuster mechanism and pivotally coupled to the lower cover so as to conceal the at least part of the upper member of the adjuster mechanism during the vertical adjustment of the upper member relative to the lower member.

According to another aspect of the invention, a seat assembly is provided for supporting an occupant above a floor in a vehicle. The seat assembly includes a track mechanism, an adjuster mechanism and a cover assembly. The track mechanism has a lower rail and an upper rail. The lower rail is fixedly secured to the floor of the vehicle. The upper rail is slidably coupled to the lower rail for generally horizontal adjustment relative to the lower rail. The adjuster mechanism is fixedly secured to the upper rail. The adjuster mechanism includes a movable upper member operative for height adjustment relative to the upper rail of the track mechanism. The cover assembly has a lower cover and an upper cover. The lower cover is coupled to the upper rail for movement therewith. The upper cover covers at least part of the adjuster mechanism. The upper cover is pivotally coupled to the upper member of the adjuster mechanism and pivotally coupled to the lower cover so as to conceal the at least part of the adjuster mechanism during the vertical adjustment of the upper member relative to the upper rail.

BRIEF DESCRIPTION OF THE DRAWINGS

Advantages of the present invention will be readily appreciated as the same becomes better understood by reference to the following detailed description when considered in connection with the accompanying drawings, wherein.

DESCRIPTION OF THE INVENTION

Figure 1:
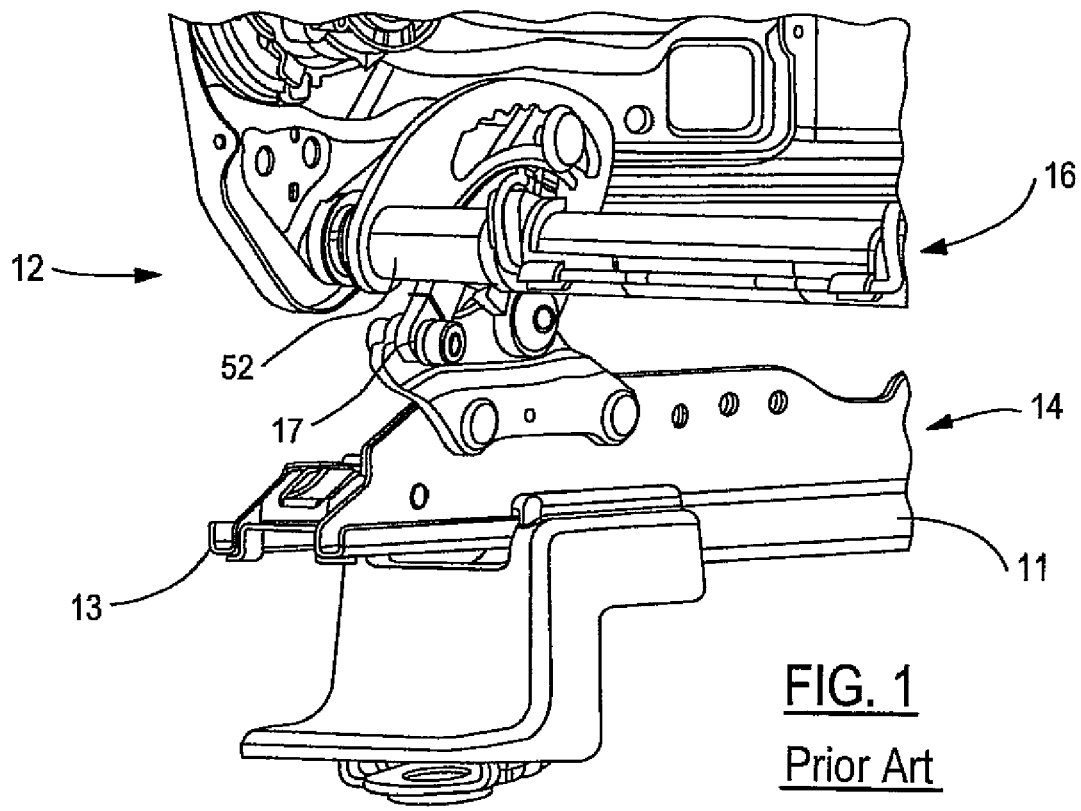
FIG. 1 is an enlarged rear perspective view of a seat assembly having a height adjuster mechanism.

Referring to FIG. 1, an adjuster mechanism for a seat assembly is generally indicated at 12. The adjuster mechanism 12 includes a track mechanism 14 and a height adjuster mechanism 16. The track mechanism 14 includes a lower rail 11 fixedly secured to the vehicle and an upper rail 13 slidably coupled to the lower rail 11 to allow fore and aft adjustment of the seat in the vehicle. The height adjuster mechanism 16 is mounted to the upper rail 13 and moves therewith in the fore and aft direction relative to the lower rail 11. The height adjuster mechanism 16 allows height adjustment of a seat cushion relative to the upper rail 13.

Figure 2:
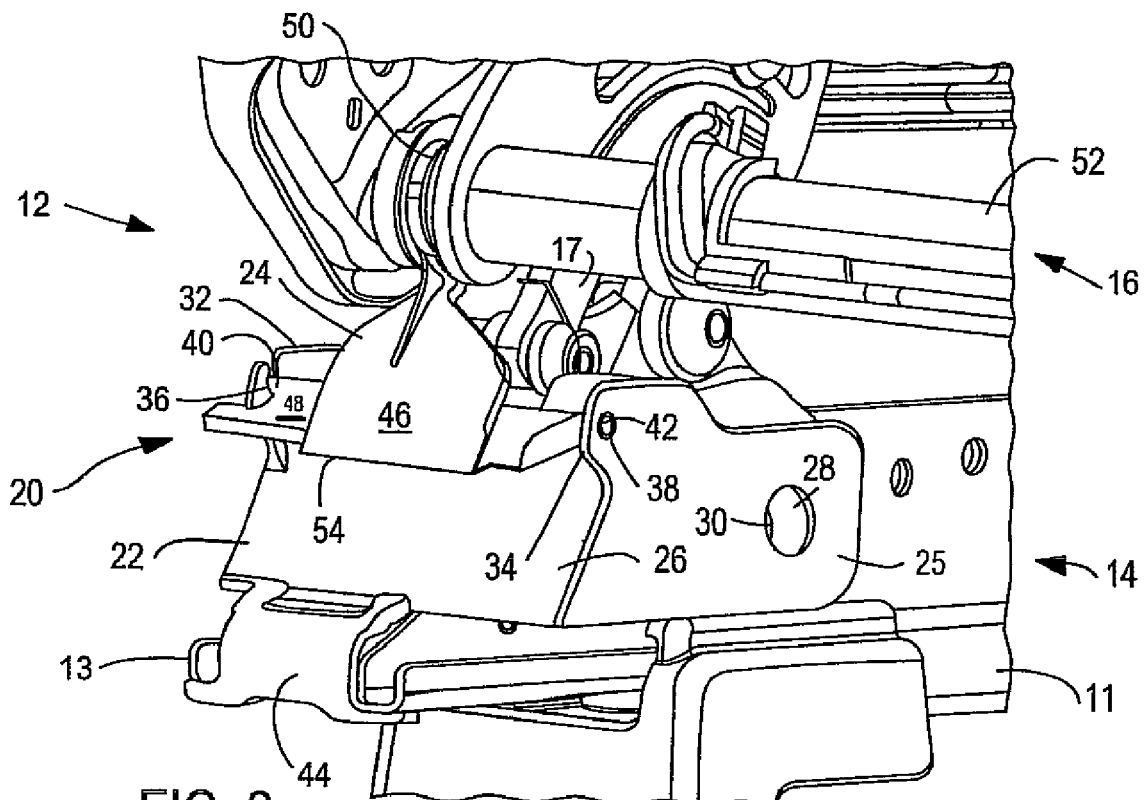
FIG. 2 is an enlarged rear perspective view of the seat assembly of FIG. 1 incorporating a cover assembly according to the invention.
Figure 3:
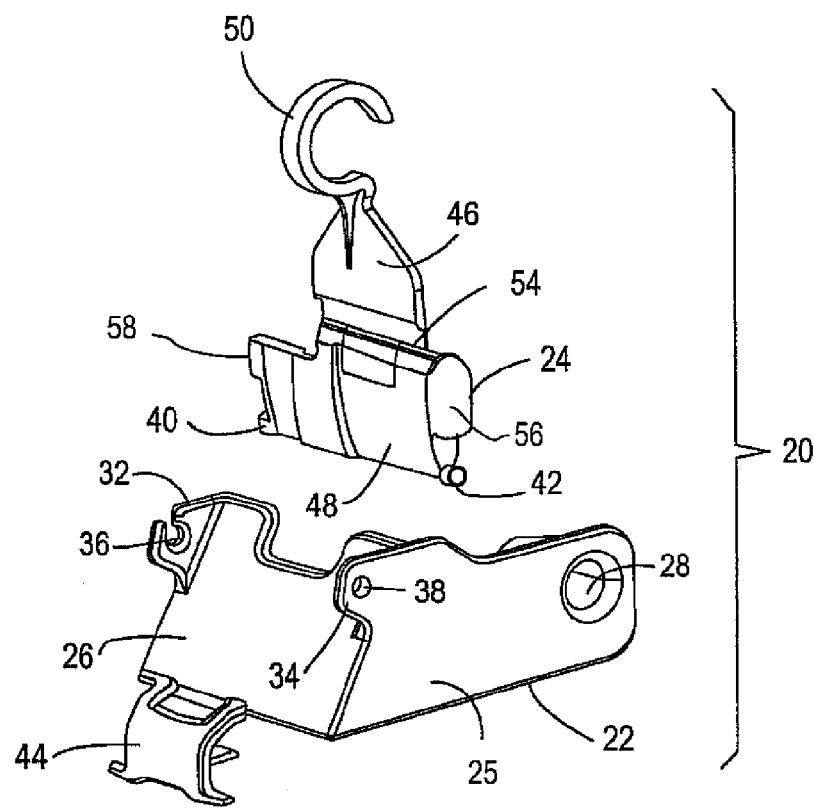
FIG. 3 is an exploded perspective view of the cover assembly.
Figure 4:
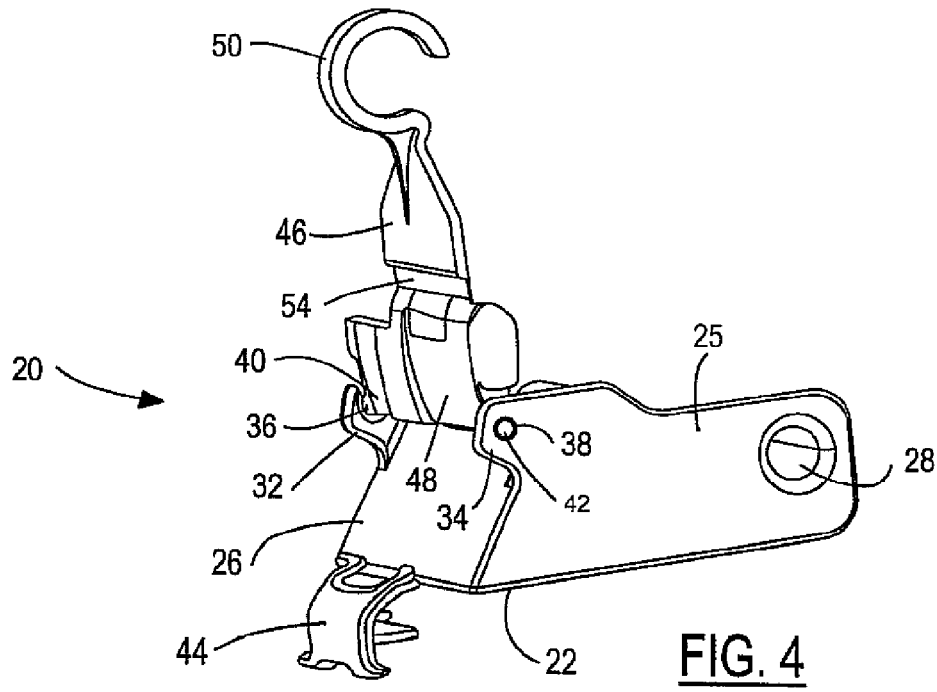
FIG. 4 is a perspective view of the cover assembly.

Referring to FIGS. 2-4, a cover assembly for covering a portion of the adjuster mechanism 12 is generally indicated at 20. The cover assembly 20 includes a lower cover 22 and an upper cover 24. The lower cover 22 is configured to be fixedly secured to the upper rail 13 of the track mechanism 14. The lower cover 22 includes a side wall 25 and an angled end wall 26. The side 25 and end 26 walls are generally orthogonal to each other. The side wall 25 includes a boss 28 with an aperture 30 for attaching the lower cover 22 to the upper rail 13 with a screw or other suitable fastener.

A pair of arms 32, 34 extends outwardly from the end wall 26. An aperture 36, 38 is formed in each arm 32, 34. The apertures 36, 38 are substantially aligned and receive outwardly extending pins 40, 42 formed on the upper cover 24. One of the arms 32 may have an opening to the aperture 36 to facilitate snap insertion of pins 40, 42 of the upper cover into the aperture 36, 38. Additionally, a tab 44 is formed to extend from a lower portion of the end wall 26. The tab 44 locates and slides under the upper rail 13.

The upper cover 24 extends between upper 46 and lower 48 portions. The upper portion 46 includes a C-shaped hook 50 for coupling the upper cover 24 to a rear pipe 52 of the height adjuster mechanism 16. A living hinge 54 is formed between the hook 50 and the lower portion 48 of the cover 24. The upper cover 24 is molded in one piece of a suitable moldable material such as an elastomer. The living hinge 54 is a thin web which permits the hook 50 to bend with respect to the lower portion 48. The lower portion 48 is generally rectangular and extends between spaced apart and opposite sides 56, 58. The pins 40, 42 extend outwardly from respective sides 56, 58 of the lower portion 48 for pivotal mounting to the lower cover 22.

In assembly, the lower cover 22 is coupled to the upper rail 13 by fasteners. The upper cover 24 is pivotally coupled to the lower cover 22 by inserting the pins 40, 42 through the apertures 36, 38. The hook 50 of the upper cover 24 is snapped onto the rear pipe 52 of the adjuster mechanism 16.

In use, the cover assembly 20 conceals the upper rail 13 and moving links 17 of the adjuster mechanism 16 even during fore and aft adjustment and during height adjustment of the seat. During fore and aft adjustment, the cover assembly 20 moves with the upper rail 13 relative to the lower 11. During height adjustment, the rear pipe 52 of the adjuster mechanism 16 is displaced upwardly and downwardly with the seat. The hook 50 remains attached to the rear pipe 52 throughout the full vertical displacement of the rear pipe 52.

The living hinge 54 accommodates the generally vertical displacement of the rear pipe 52 relative to the upper rail 13 by bending and allowing relative pivotal movement between the upper 46 and lower 48 portions of the upper cover 24. During the vertical displacement of the seat and rear pipe 52, the lower portion 48 of the lower cover 22 pivots about the pins 40, 42, the living hinge 54 bends, and the hook 50 pivots about the rear pipe 52. The upper cover 24 remains substantially upright throughout the vertical movement of the rear pipe 52, thereby concealing the moving links 17 during the full range of height adjustment of the seat. In FIG. 2, the adjuster mechanism 12 is shown in a fully lowered position. The living hinge 54 is bent to accommodate the generally horizontal orientation of the lower portion 48 and the generally upright orientation of the upper portion 46. When the seat is raised, the upper cover 24 unfolds about the living hinge 54, so that both the upper 46 and lower 48 portions are substantially upright to conceal the extended moving links 17. Thus, the cover assembly 20 conceals the upper rail 13 and moving links 17 during operation of the adjuster mechanism 12.

The invention has been described in an illustrative manner. It is, therefore, to be understood that the terminology used is intended to be in the nature of words of description rather than of limitation. Many modifications and variations of the invention are possible in light of the above teachings. For example, the cover assembly may also be coupled to a seat assembly with only a height adjuster mechanism and no sliding track mechanism. In this case, the lower cover would be coupled to a lower member fixed vertically relative to the vehicle floor and the upper cover would be coupled to an upper member of the adjuster assembly that adjusts vertically with respect to the lower member. The upper cover would be pivotally coupled to the lower cover as described above to accommodate the vertical adjustment of the upper member relative to the lower member. Thus, within the scope of the appended claims, the invention may be practiced other than as specifically described.

We claim:

1. A cover assembly for covering a portion of a seat adjuster mechanism, said cover assembly comprising:
   a lower cover; and
   an upper cover connected to the lower cover, the upper cover having an upper portion and a lower portion, the upper portion configured to be pivotally coupled to the seat adjuster mechanism at one end and pivotally coupled about a first pivot axis to the lower portion at an opposite end, said upper cover moving about the first pivot axis during operation of the seat adjuster mechanism,
   wherein the upper cover and the lower cover are pivotally coupled about a second pivot axis,
   wherein the first pivot axis extends parallel to the second pivot axis,
   wherein the upper portion is pivotally connected to the lower portion by a living hinge that allows the upper portion and the lower portion to pivot relative to each other about the living hinge.

2. The cover assembly as set forth in claim 1, wherein the upper portion of the upper cover remains substantially upright during vertical adjustment of the adjuster mechanism.

3. The cover assembly as set forth in claim 1, wherein the upper portion and the lower portion of the upper cover are substantially orthogonal to each other when the adjuster mechanism is adjusted to its lowest position.

4. A seat assembly for supporting an occupant above a floor in a vehicle, said seat assembly comprising:
   a track mechanism having a lower rail and an upper rail, the lower rail being fixedly secured to the floor of the vehicle, the upper rail being slidably coupled to the lower rail for generally horizontal adjustment relative to the lower rail;
   an adjuster mechanism fixedly secured to the upper rail, the adjuster mechanism including a movable upper member operative for height adjustment relative to the upper rail of the track mechanism; and
   a cover assembly having a lower cover and an upper cover, the lower cover being coupled to the upper rail for movement therewith, the upper cover covering at least part of the adjuster mechanism, the upper cover being pivotally coupled to the upper member of the adjuster mechanism and pivotally coupled to the lower cover so as to conceal the at least part of the adjuster mechanism during the vertical adjustment of the upper member relative to the upper rail.

5. The seat assembly as set forth in claim 4, wherein the upper cover includes an upper portion pivotally coupled to the upper member of the adjuster mechanism.

6. The seat assembly as set forth in claim 5, wherein the upper cover includes a lower portion pivotally coupled to the lower cover.

7. The seat assembly as set forth in claim 6, wherein the upper cover includes a living hinge that allows the upper portion and the lower portion to pivot relative to each other about the living hinge.

8. The seat assembly as set forth in claim 7, wherein the upper portion of the upper cover remains substantially upright during vertical adjustment of the upper member of the adjuster mechanism.

9. The seat assembly as set forth in claim 7, wherein the upper portion and the lower portion of the upper cover are substantially orthogonal to each other when the upper member of the adjuster mechanism is adjusted to its lowest position.

10. The seat assembly as set forth in claim 4, wherein the upper cover includes a pair of pins extending outwardly from opposite sides thereof, the pins being substantially coaxial and extending through respective apertures in the lower cover for pivotal movement of the upper cover relative to the lower cover.

11. The seat assembly as set forth in claim 10, wherein the apertures are formed in respective arms extending outwardly from the upper cover.

12. The seat assembly as set forth in claim 11, wherein one of the arms includes a slot continuous with one of the apertures to facilitate insertion of the pins into the respective apertures.

13. The seat assembly as set forth in claim 12, wherein the upper cover includes a C-shaped hook that pivotally couples the upper cover to the upper member of the adjuster mechanism.

14. A cover assembly for covering a portion of a seat adjuster mechanism, said cover assembly comprising:
a lower cover; and
an upper cover connected to the lower cover, the upper cover having an upper portion and a lower portion, the upper portion configured to be pivotally coupled to the seat adjuster mechanism at one end and pivotally coupled about a first pivot axis to the lower portion at an opposite end, said upper cover moving about the first pivot axis during operation of the seat adjuster mechanism,
wherein the upper cover includes a pair of pins extending outwardly from opposite sides thereof, the pins being substantially coaxial and extending through respective apertures in the lower cover for pivotal movement of the upper cover relative to the lower cover.

15. A cover assembly for covering a portion of a seat adjuster mechanism, said cover assembly comprising:
a lower cover; and
an upper cover connected to the lower cover, the upper cover having an upper portion and a lower portion, the upper portion configured to be pivotally coupled to the seat adjuster mechanism at one end and pivotally coupled about a first pivot axis to the lower portion at an opposite end, said upper cover moving about the first pivot axis during operation of the seat adjuster mechanism,
wherein the upper cover includes a C-shaped hook that pivotally couples the upper cover to the adjuster mechanism.

16. The cover assembly as set forth in claim 14, wherein the apertures are formed in respective arms extending outwardly from the upper cover.

17. The cover assembly as set forth in claim 16, wherein one of the arms includes a slot continuous with one of the apertures to facilitate insertion of the pins into the respective apertures.

* * * * *